US009335170B2

(12) United States Patent
Lin et al.

(10) Patent No.: US 9,335,170 B2
(45) Date of Patent: May 10, 2016

(54) INERTIAL SENSOR AND METHOD OF LEVITATION EFFECT COMPENSATION

(71) Applicant: FREESCALE SEMICONDUCTOR, INC., Austin, TX (US)

(72) Inventors: Yizhen Lin, Cohoes, NY (US); Jan Mehner, Neukirchen (DE); Michael Naumann, Burgstadt (DE)

(73) Assignee: Freescale Semiconductor, Inc., Austin, TX (US)

( * ) Notice: Subject to any disclaimer, the term of this patent is extended or adjusted under 35 U.S.C. 154(b) by 704 days.

(21) Appl. No.: 13/687,299

(22) Filed: Nov. 28, 2012

(65) Prior Publication Data
US 2014/0144231 A1   May 29, 2014

(51) Int. Cl.
*G01C 19/00* (2013.01)
*G01C 19/574* (2012.01)

(52) U.S. Cl.
CPC .................................. *G01C 19/574* (2013.01)

(58) Field of Classification Search
CPC ...... G01C 19/57; G01C 19/574; G01C 19/00; G01C 19/5719; G01C 19/5747
See application file for complete search history.

(56) References Cited

U.S. PATENT DOCUMENTS

| 6,067,858 | A * | 5/2000 | Clark ................. | G01C 19/5719 73/504.16 |
| 6,752,017 | B2 * | 6/2004 | Willig ................ | G01C 19/5747 73/504.04 |
| 6,761,068 | B1 | 7/2004 | Schmid | |
| 7,481,110 | B2 * | 1/2009 | Handrich ........... | G01C 19/5726 73/504.12 |
| 7,980,115 | B2 * | 7/2011 | Stewart .............. | G01P 15/14 73/1.38 |
| 8,438,922 | B2 * | 5/2013 | Jomori ............... | G01C 19/5747 73/504.12 |
| 8,459,111 | B1 * | 6/2013 | Mao ................... | G01C 19/574 73/504.14 |
| 8,661,898 | B2 * | 3/2014 | Watson .............. | G01C 19/5691 73/504.08 |
| 2001/0039834 | A1 * | 11/2001 | Hsu .................... | G01C 19/5719 73/504.02 |
| 2001/0043450 | A1 * | 11/2001 | Seale .................. | F01L 9/04 361/160 |
| 2003/0061877 | A1 * | 4/2003 | Stewart .............. | G01C 19/5747 73/510 |
| 2003/0159510 | A1 * | 8/2003 | Stewart .............. | G01C 19/5705 73/504.12 |
| 2006/0213266 | A1 | 9/2006 | French et al. | |
| 2007/0144255 | A1 * | 6/2007 | Handrich ........... | G01C 19/5726 73/504.12 |
| 2012/0240679 | A1 * | 9/2012 | Netzer ................ | G01P 15/125 73/514.32 |
| 2013/0298670 | A1 * | 11/2013 | Tsugai ................ | G01C 19/56 73/504.12 |

OTHER PUBLICATIONS

Tang et al., Electrostatically Balanced Comb Drive for Controlled Levitation, IEEE 1990, CH2783-9/90/0000-0023, pp. 23-27.

* cited by examiner

*Primary Examiner* — Laura Martin
*Assistant Examiner* — Samir M Shah
(74) *Attorney, Agent, or Firm* — Charlene R. Jacobsen

(57) ABSTRACT

An inertial sensor (110) includes a drive system (118) configured to oscillate a drive mass (114) within a plane (24) that is substantially parallel to a surface (50) of a substrate (28). The drive system (118) includes first and second drive units (120, 122) having fixed fingers (134, 136) interleaved with movable fingers (130, 132) of the drive mass (114). At least one of the drive units (120) is located on each side (126, 128) of the drive mass (114). Likewise, at least one of the drive units (122) is located on each side (126, 128) of the drive mass (114). The drive units (122) are driven in phase opposition to the drive units (120) so that a levitation force (104) generated by the drive units (122) compensates for, or at least partially suppresses, a levitation force (100) generated by the drive units (120).

11 Claims, 4 Drawing Sheets

PRIOR ART

FIG. 3
PRIOR ART

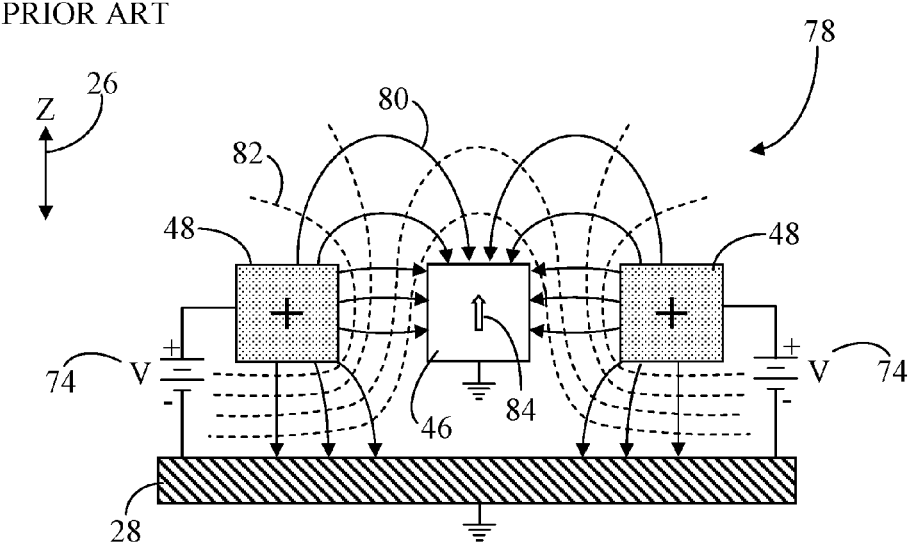

FIG. 4

$$FZ_{LEV} \sim V^2(L_0 - X_d)(Z_0 - Z_s)/Z_0 \quad \leftarrow 88$$

WHERE:
$FZ_{LEV}$: LEVITATION FORCE ALONG SENSE AXIS (Z)
$Z_0$: ZERO LEVITATION FORCE POSTION
$Z_s$: LEVITATION FORCE POSTION, DUE TO DRIVE MOTION
$L_0$: OVERLAP DISTANCE OF MOVABLE AND FIXED FINGERS
$X_d$: MAGNITUDE OF DRIVE MASS TRAVEL

THUS:

$$FZ_{DAU+} \sim (V_p^2 + V_i^2\cos^2\omega t + 2V_pV_i\cos\omega t)(L_0 + X_d\sin\omega t) \quad \leftarrow 98$$
$$FZ_{DAU-} \sim (V_p^2 + V_i^2\cos^2\omega t - 2V_pV_i\cos\omega t)(L_0 - X_d\sin\omega t) \quad \leftarrow 102$$

WHICH PRODUCES TWO FUNDAMENTALS:

$$2V_pV_iL_0\cos\omega t \quad \text{AND} \quad V_p^2X_d\sin\omega t$$

PRIOR ART

INERTIAL SENSOR AND METHOD OF LEVITATION EFFECT COMPENSATION

TECHNICAL FIELD OF THE INVENTION

The present invention relates generally to microelectromechanical systems (MEMS) devices. More specifically, the present invention relates to a structure and method of compensating for a levitation effect in a MEMS inertial sensor.

BACKGROUND OF THE INVENTION

Microelectromechanical systems (MEMS) technology has achieved wide popularity in recent years, as it provides a way to make very small mechanical structures and integrate these structures with electrical devices. One common application of MEMS is the design and manufacture of sensor devices. MEMS sensor devices are widely used in applications such as automotive, inertial guidance systems, household appliances, game devices, protection systems for a variety of devices, and many other industrial, scientific, and engineering systems. One example of a MEMS sensor is a MEMS angular inertial sensor. Alternatively referred to as an "angular rate sensor," "gyroscope", "gyrometer," "gyroscope sensor," or "yaw rate sensor," an angular rate sensor senses angular speed or velocity around one or more axes.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a conceptual view of a levitation effect in the inertial sensor of FIG. 1;

FIG. 4 shows a diagram of equations exemplifying the levitation effect;

DETAILED DESCRIPTION

Embodiments disclosed herein entail microelectromechanical systems (MEMS) sensor devices in the form of, for example, angular rate sensors and angular accelerometer sensors having one or more teeter-totter type sense masses. In an illustrative embodiment, an angular rate sensor may be configured to sense angular rotation rate about an axis parallel to the substrate of the angular rate sensor due to the influence of a Coriolis acceleration component. Such an angular rate sensor typically uses a comb drive system to produce an electrostatic drive force that oscillates a drive mass at a relatively large amplitude and excites a secondary oscillation in either the same mass or in a sense mass due to this Coriolis force.

Comb drive systems make use of a lateral electrostatic driving force (parallel to the plane of the substrate) to activate the drive mass. Unfortunately, a comb drive system can produce a levitation force in the Z-axis (normal to the plane of the substrate). In angular rate sensors in which the sense axis is in the Z-direction, this levitation force can cause an erroneous output signal. Embodiments of the invention compensate for this levitation force to yield a more accurate output.

Figure 1:
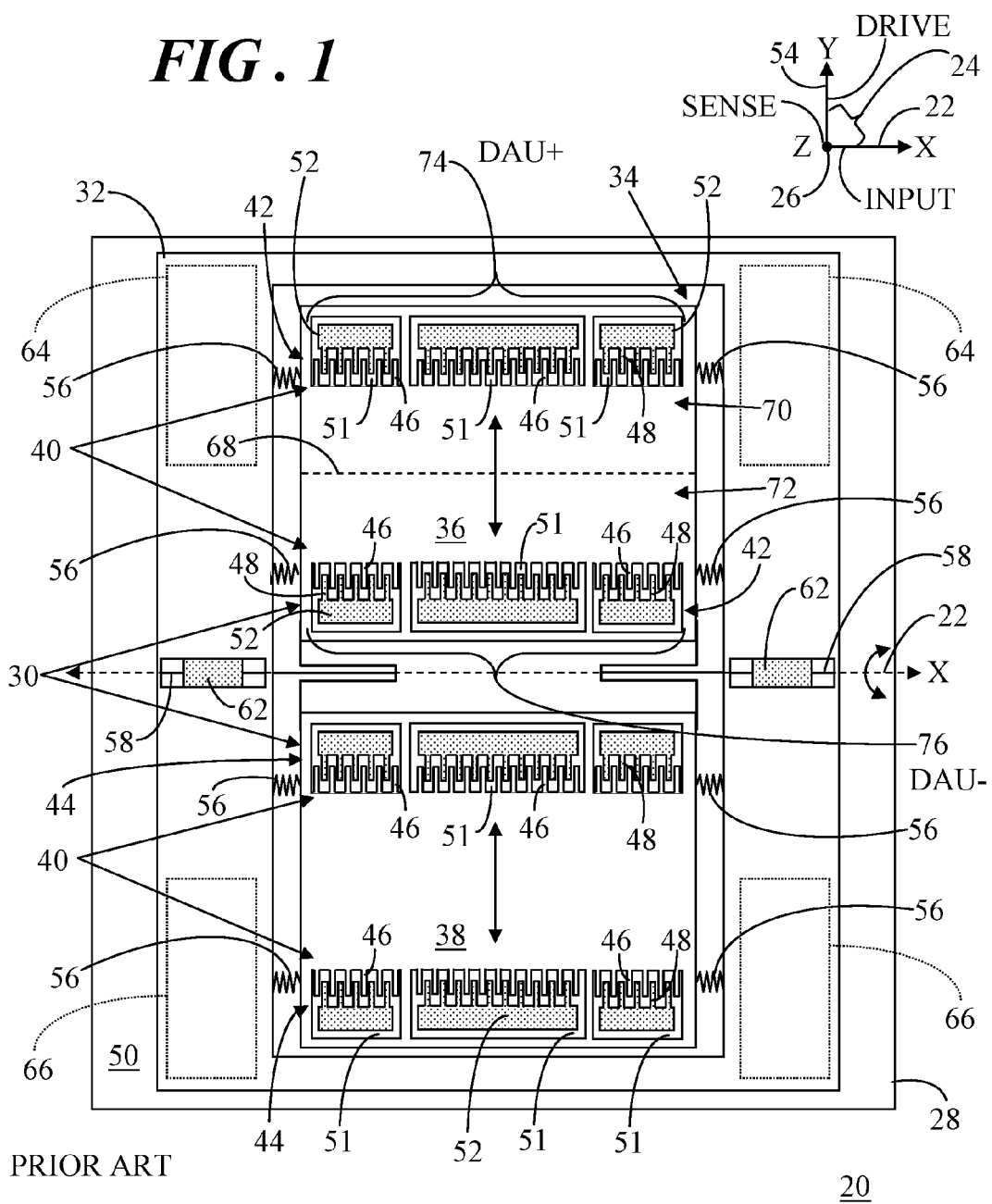
FIG. 1 shows a top view of a prior art inertial sensor.
Figure 2:
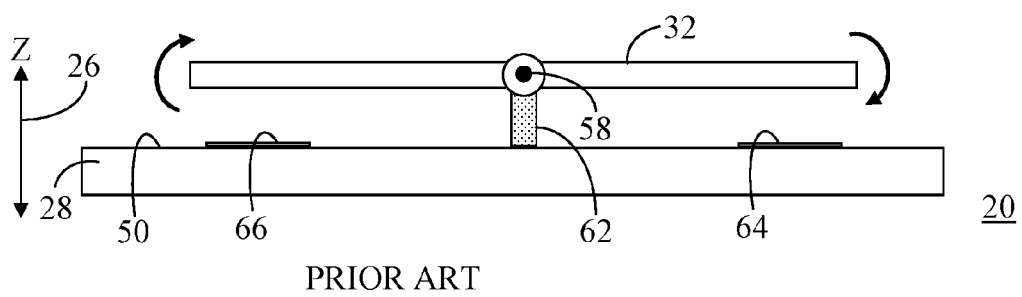
FIG. 2 shows a side conceptual view of the inertial sensor of FIG. 1.

Referring to FIGS. 1 and 2, FIG. 1 shows a top view of a prior art inertial sensor 20 and FIG. 2 shows a side conceptual view of inertial sensor 20. Prior art inertial sensor 20 is provided herein to illustrate an unwanted levitation force that may occur in prior art designs. Inertial sensor 20 is generally configured to sense angular rate about an axis of rotation referred to as an input axis 22. In the illustrated configuration, input axis 22 is the X-axis in a three-dimensional coordinate system. Accordingly, inertial sensor 20 is referred to herein as an angular rate sensor 20. By convention, angular rate sensor 20 is illustrated as having a generally planar structure within an X-Y plane 24, wherein a Z-axis 26 extends out of the page, normal to X-Y plane 24 in FIG. 1 and Z-axis 26 extends upwardly and downwardly as shown in FIG. 2.

Angular rate sensor 20 includes a substrate 28, a drive mass system 30, a sense mass 32, and various mechanical linkages. In the specific embodiment of FIGS. 1 and 2, drive mass system 30 resides in a central opening 34 extending through sense mass 32. Drive mass system 30 includes a drive mass 36 and another drive mass 38 disposed laterally in X-Y plane 24 from drive mass 36. Drive masses 36 and 38 are situated symmetrically relative to one another about axis of rotation 22.

A drive system 40 resides in central opening 34. Drive system 40 includes sets of drive elements 42 configured to oscillate drive mass 36 and sets of drive elements 44 configured to oscillate drive mass 38. Each set of drive elements 42 and 44 includes pairs of electrodes, referred to as movable fingers 46 and fixed fingers 48. In an embodiment, movable fingers 46 are coupled to and extend from each of drive masses 36 and 38.

Fixed fingers 48 are fixed to a surface 50 of substrate 28 via anchors 52 and extend through cut-out regions 51 of drive masses 36 and 38. Fixed fingers 48 are spaced apart from and positioned in alternating arrangement with movable fingers 46. By virtue of their attachment to drive masses 36 and 38, movable fingers 46 are movable together with drive masses 36 and 38. Conversely, due to their fixed attachment to substrate 28 via anchors 52, fixed fingers 48 are stationary relative to movable fingers 46. For consistency throughout the description of the following figures, any anchoring structures, such as anchors 52, that connect an element of angular rate sensor 20 to the underlying surface 50 of substrate 28 is illustrated with a stippled pattern. Conversely, any elements that are not anchoring structures do not include this stippled pattern and are therefore suspended above surface 50 of substrate 28.

Drive masses 36 and 38 may be configured to undergo oscillatory motion within X-Y plane 24. In general, an alternating current (AC) voltage may be applied to fixed fingers 48 via a drive circuit (not shown) to cause drive masses 36 and 38 to oscillate along a Y-axis 54. Drive masses 36 and 38 may be suitably linked together or otherwise driven to move in opposite directions, i.e., antiphase, along Y-axis 54.

Link spring components 56 couple each of drive masses 36 and 38, respectively, to sense mass 32. As such, drive masses 36 and 38 are suspended above surface 50 of substrate 28 and do not have a direct physical attachment to substrate 28. Angular rate sensor 20 further includes flexible support elements in the form of torsion springs 58 coupled to sense mass 32. Torsion springs 58 connect sense mass 32 to surface 50 of substrate 28 via anchors 62.

A variety of conductive plates, or electrodes, may be formed on surface 50 of substrate 28 in conjunction with the other fixed components of angular rate sensor 20. In this simplified illustration, the electrodes include sense electrodes 64 and 66, used to sense the rotation of angular rate sensor 20 about X-axis 22. Electrodes 64 and 66 are visible in FIG. 2, but are obscured in FIG. 1 by the overlying sense mass 32. Accordingly, in FIG. 1, electrodes 64 and 66 are represented in dashed line form to illustrate their physical placement relative to sense mass 32.

In operation, drive masses 36 and 38 of drive mass system 30 undergo oscillatory linear motion within X-Y plane 24 in antiphase. In the illustrated embodiment, wherein the axis of rotation is designated as X-axis 22, drive masses 36 and 38 oscillate in opposite directions approximately parallel to Y-axis 54 (i.e., up and down in FIG. 1). Once drive masses 36 and 38 are put into oscillatory motion (antiphase) along Y-axis 54, the system of masses 32, 36, and 38 is capable of detecting angular rate, i.e., angular velocity, induced by angular rate sensor 20 being rotated about X-axis 22. In particular, as a result of a Coriolis acceleration component, torsion springs 58 enable sense mass 32 to oscillate out of X-Y plane 24 as a function of angular rate, i.e., the angular velocity, of angular rate sensor 20 about X-axis of rotation 22. This movement has an amplitude that is proportional to the angular rotation rate of angular rate sensor 20 about the input axis, i.e., X-axis 22, which is sensed at electrodes 64 and 66.

Drive masses 36 and 38 can suffer from a levitation effect resulting from a levitation force. Levitation force is a phenomenon occurring in electrostatically actuated MEMS devices where a structure meant to move parallel to the substrate is forced away from the substrate due to electrical fringing fields. In surface micromachined devices, the thickness of the functional layer is on the order of twenty-five microns and the width of the beams for in-plane motion is on the order of two microns. Thus, the stiffness out-of-plane is typically much larger than in-plane. Accordingly, the coupling of in-plane motion (e.g., four microns) into out-of-plane motion is very small (e.g., a few nanometers). However, the actual sense signal sensed at electrodes 64 and 66 from angular rate imposed on sensor 20 is also very small (e.g., a few nanometers). As such, the levitation effect is very severe because it can be in the same order of magnitude as the sense signal. Consequently, it may be impossible to distinguish between the levitation effect and the actual sense signal.

At ideal geometrical dimensions, angular rate sensor 20 would not be adversely affected by the levitation effect because any levitation effects imposed on drive masses 36 and 38 would cancel out since drive masses 36 and 38 are arranged symmetrically around X-axis 22. In other words, both of drive masses 36 and 38 would move the same amount of displacement out-of-plane due to levitation forces. Since drive masses 36 and 38 are symmetric about X-axis 22, sense mass 32 would not tilt around X-axis 22 due to the levitation forces. However, due to geometric imperfections, drive masses 36 and 38 do not move symmetrically out-of-plane. This asymmetrical out-of-plane movement produces an effective moment around X-axis 22 which causes sense mass 32 to deflect. The levitation effect will be discussed in connection with drive mass 36. However, the following discussion applies equally to drive mass 38.

Drive mass 36 can be subdivided by a centerline 68 into a first side 70 and a second side 72. Typically, one side of drive mass 36, for example, first side 70, is actuated by a first drive signal 74, labeled DAU+, and the opposing side, i.e., second side 72, is actuated by a second drive signal 76, labeled DAU−, which is in 180° phase opposition to first drive signal 74. As such, electrostatic force is applied to drive mass 36 from both sides of centerline 68. This drive scheme is sometimes referred to as push-pull driving, and is in a sinusoidal format.

Successful electrostatic actuation of microelectromechanical structures, such as angular rate sensor 20, calls for a ground plane under the structure in order to shield it from relatively large vertical fields. Unfortunately, this ground plane contributes to an unbalanced electrostatic field distribution. The non-symmetrical field distribution results in a net vertical force induced on movable fingers 46.

Referring to FIG. 3 in connection with FIGS. 1-2, FIG. 3 shows FIG. 3 shows a conceptual view of a levitation effect 78 in angular rate sensor 20 (FIG. 1). The positively biased fixed fingers 48 induce negative charge on both the underlying ground plane, i.e., substrate 28, and movable fingers 46. The simplified cross-section of FIG. 3 illustrates fixed fingers 48 with the same voltage, e.g., first drive signal 74, applied to all fixed fingers 48 on one side of centerline 68, including the electrostatic field distribution, represented by solid lines 80, and potential contours, represented by solid lines 82. The electrostatic field distribution 80 is known as an electrical fringing field 80. The like charges yield a vertical force, referred to as a levitation force 84 that repels or levitates movable fingers 46 away from substrate 28. Accordingly, levitation force 84 can cause drive mass 36 and consequently sense mass 32 to rock about centerline 68. Since the sense direction of sense mass 32 is Z-axis 26, the non-symmetrical electrical fringing field 80 due to the existence of the ground plane of substrate 28 can cause erroneous output.

FIG. 4 shows a diagram 86 of equations exemplifying levitation effect 78 (FIG. 3). In general, levitation force 84, $FZ_{LEV}$, along the Z-axis (i.e., an out-of-plane force) can be approximated by an equation 88 which is a function of a zero levitation force position 90, $Z_O$, of movable fingers 46 (which depends on geometry), a levitation force position 92, $Z_S$, due to drive motion, an overlap distance 94 (see FIG. 1), $L_O$, of movable fingers 46 with fixed fingers 48, and a magnitude 96, $X_d$, of travel of drive mass 36. Thus, levitation force 84 depends on overlap distance 94, drive travel magnitude 96, and the applied voltage (i.e., first or second drive signal 74 and 76) that causes the resulting change of position from zero levitation force position 90 to levitation force position 92.

A first equation 98 relates a first levitation error component, i.e., a levitation force 100, $FZ_{DAU+}$, to the applied first drive signal 74, DAU+(FIG. 1), and a second equation 102 relates a second levitation error component i.e., a levitation force 104, $FZ_{DAU-}$, to the applied second drive signal 76, DAU− (FIG. 1). First and second equations 98 and 102 reveal that levitation forces 100 and 104, respectively, have multiple frequency content. Most critically, however, first harmonics, i.e., fundamentals 106 and 108, are produced. These fundamentals 106 and 108 are in quadrature with the displacement of drive mass 36 in the sense direction, i.e. Z-axis 26, i.e., the drive frequency of drive mass 36. Furthermore, these fundamentals 106 and 108 are 180° out of phase between first drive signal 74, DAU+, and second drive signal 76, DAU−, causing the rocking motion of drive mass 36.

Figure 5:
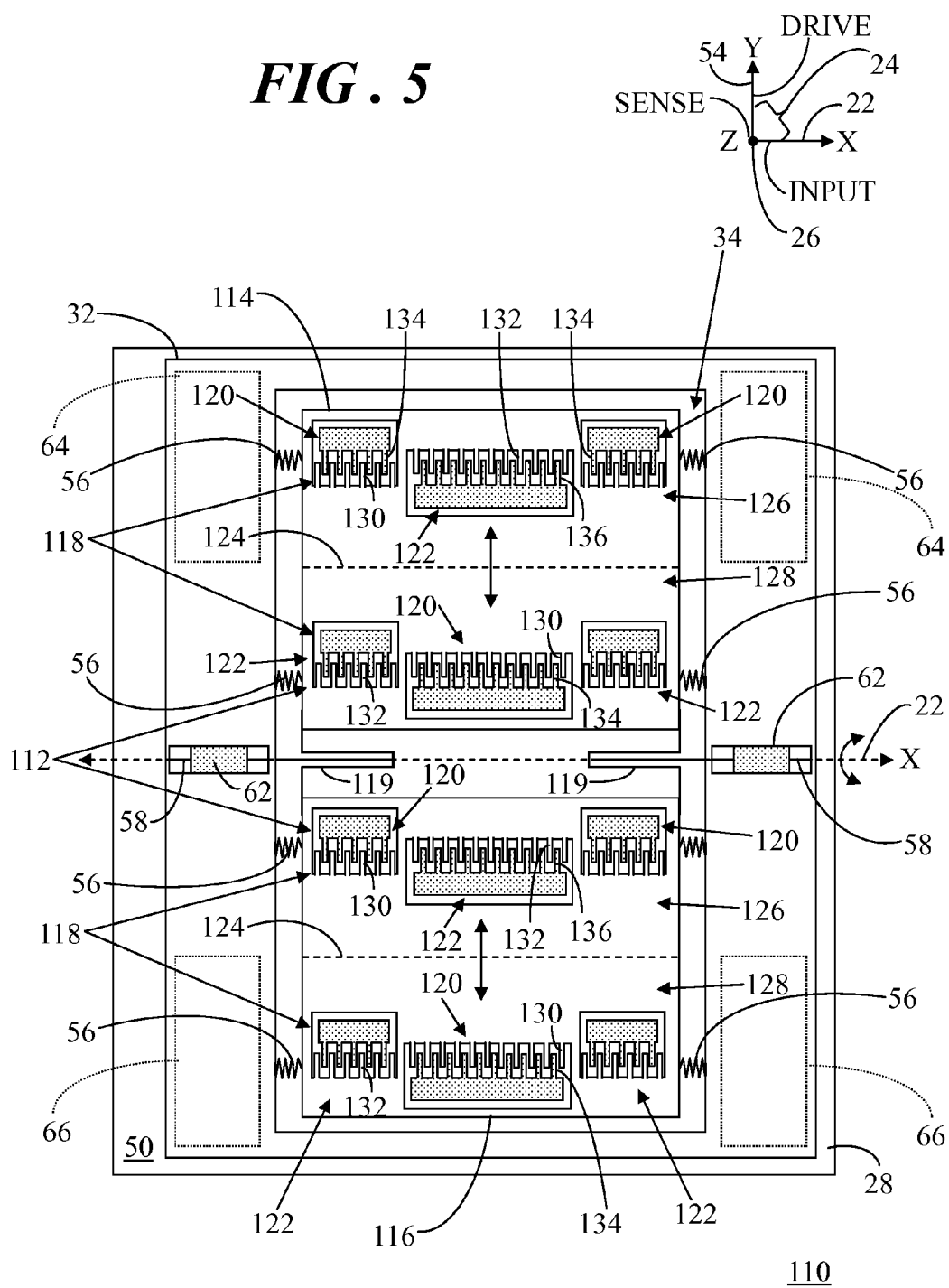
FIG. 5 shows a top view of an inertial sensor in accordance with an embodiment.
Figure 6:
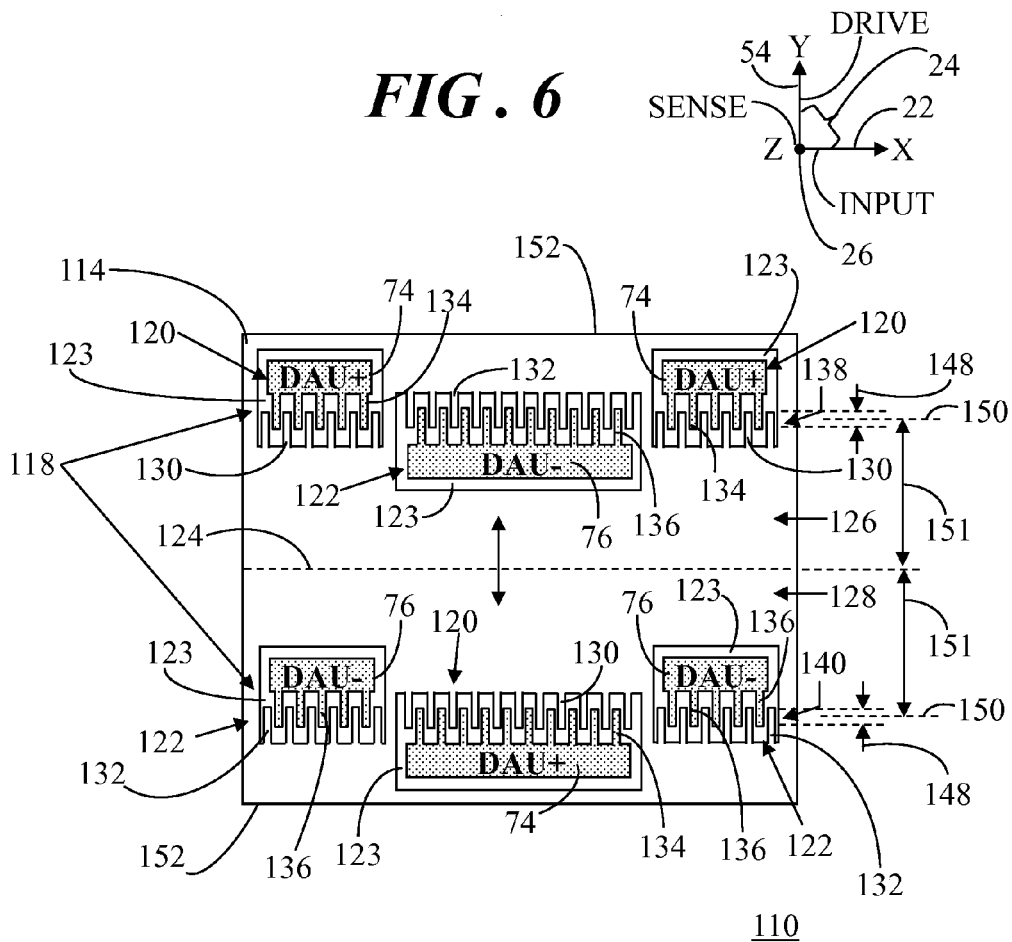
FIG. 6 shows a top enlarged view of a portion of the inertial sensor of FIG. 5.

Referring to FIGS. 5 and 6, FIG. 5 shows a top view of an inertial sensor 110 in accordance with an embodiment, and FIG. 6 shows a top enlarged view of a portion of inertial sensor 110. Like angular rate sensor 20, inertial sensor 110 is generally configured to sense angular rate about an axis of rotation referred to as an input axis 22, i.e. the X-axis, where drive axis 54 is the Y-axis and sense axis 26 is the Z-axis. Thus, inertial sensor 110 is referred to herein as an angular rate sensor 110. Many of the components of angular rate sensor 110 are the same as for angular rate sensor 20. As such, the same references numbers will be utilized for the same elements and a description of their structure and function will not be repeated. However, in accordance with an embodiment, drive mass system 30 having drive masses 36 and 38 is replaced by a drive mass system 112 having drive masses 114 and 116. Additionally, a drive system 118 replaces drive system 40.

In general, drive mass 116 is disposed laterally in X-Y plane 24 from drive mass 114, and drive masses 114 and 116 are situated symmetrically relative to one another about axis of rotation 22. Drive masses 114 and 116 may be suitably linked together via spring members 119 so that they move in opposite directions, i.e., antiphase, along Y-axis 54. Alternatively, drive masses 114 and 116 may not be linked together, but they may be otherwise suitably driven to move in antiphase.

Drive system 118 resides in central opening 34 and operably communicates with each of drive masses 114 and 116. Drive system 118 is configured to oscillate drive masses 114 and 116 in antiphase within X-Y plane 24. However, the fixed fingers in drive system 118 carrying first drive signal 74 (labeled DAU+ in FIG. 6) and the fixed fingers carrying second drive signal 76 (labeled DAU− in FIG. 6) are split and interleaved to compensate for a levitation force that might otherwise cause a rocking mode of sense mass 32 for angular rate sensor 110. As such, levitation effect 78 (FIG. 3) is largely compensated for in order to yield improved accuracy in angular rate sensor 110.

The design of drive system 118 together with drive mass 114 is described in detail below and is particularly illustrated in the portion of inertial sensor 110 illustrated in FIG. 6 in order to appreciate how levitation effect 78 may be suppressed. However, the following discussion applies equally to drive system 118 together with drive mass 116. In addition, it will become apparent that the design of drive system 118 together with drive mass 114 may be readily adapted in a variety of inertial sensors in order to compensate for any levitation effect.

Drive system 118 includes first drive units 120 and second drive units 122 coupled to substrate 28 and extending through cut-out regions 123 of drive mass 114. First and second drive units 120 and 122 are configured to oscillate drive mass 114 within X-Y plane 24. The terms "first," "second," "third," and so forth used herein do not refer to an ordering or prioritization of elements within a countable series of elements. Rather, the terms "first," "second," "third," and so forth are used to distinguish certain elements, or groups of elements, from one another for clarity of discussion.

Drive mass 114 may be subdivided by a centerline 124 into a first side 126 and a second side 128, where centerline 124 is substantially parallel to the input axis, i.e., X-axis 22. At least one of first drive units 120 is located at each of first and second sides 126 and 128. Likewise, at least one of second drive units 122 is located at each of first and second sides 126 and 128. In the illustrated embodiment, two of first drive units 120 and one of second drive units 122 are located at first side 126 and one of first drive units 120 and two of second drive units 122 are located at second side 128. First and second drive units 120 and 122, respectively, are arranged in alternating fashion so that second drive units 122 are adjacent to first drive units 120 on each of first and second sides 126 and 128, respectively.

With particular reference to FIG. 6, drive mass 114 includes first movable fingers 130 and second movable fingers 132. First and second movable fingers 130 and 132 do not differ structurally from one another. Rather, the differentiating nomenclature "first" and "second" used in conjunction with movable fingers 130 and 132 is utilized herein to clearly distinguish them and to describe their interaction with first and second drive units 120 and 122.

First drive units 120 have first fixed fingers 134 anchored to surface 50 of substrate 28, and second drive units have second fixed fingers 136 anchored to surface 50 of substrate 28. First fixed fingers 134 of first drive units 120 are interleaved with first movable fingers 130 of drive mass 114. Likewise, second fixed fingers 134 of second drive units 120 are interleaved with second movable fingers 132 of drive mass 114.

It should be readily observed that first drive units 120 located at first side 126 is aligned with second drive units 122 located at second side 128. Furthermore, the first drive units 120 located at first side 126 are aligned with the second drive units 122 located at second side 128 transverse to (i.e., perpendicular to) centerline 124. Likewise, second drive unit 122 located at first side 126 is aligned with first drive unit 122 located at second side 126. Again, this second drive unit 120 located at first side 126 is aligned with this first drive unit located at second side 128 transverse to centerline 124. Consequently, first drive units 120 are transversely aligned with second drive units 122 on opposing first and second sides 126 and 128 of drive mass 114, and first and second drive units 120 and 122 are in alternating arrangement on both of first and second sides 126 and 128.

In addition to the transverse alignment and alternating arrangement discussed above, the interleaved first fixed fingers 134 of each of first drive units 120 and first movable fingers 130 of drive mass 114 have a first overlap region 138 delineating an area in which first movable fingers 130 and first fixed fingers 134 are immediately adjacent to one another. Likewise, the interleaved second fixed fingers 136 of each of second drive units 122 and second movable fingers 132 of drive mass 114 have a second overlap region 140 delineating an area in which second movable fingers 132 and second fixed fingers 136 are immediately adjacent to one another.

Each of first and second overlap regions 138 and 140 exhibits an overlap length 148. Overlap length 148 refers to the magnitude of length, $L_O$ (FIG. 4), that first movable fingers 130 are beside (i.e., overlap with) first fixed fingers 134, and the magnitude of length that second movable fingers 132 are beside second fixed fingers 136. For each of first and second drive units 120 and 122, respectively, this overlap length 148 is offset from centerline 124 by the same amount. In other words, a midpoint 150 of overlap length 148 for first and second drive units 120 and 122 is approximately equivalent. Thus, first overlap regions 138 for each of first drive units 120 and second overlap regions 140 for each of second drive units 122 located at opposing first and second sides 126 and 128 of drive mass 114 are displaced the same distance 151 away from centerline 124, and these first and second overlap regions 138 and 140, respectively, for first and second drive units 120 and 122, respectively, are aligned with one another.

In the illustrated embodiment, first and second movable fingers 130 and 132 of drive mass 114 and correspondingly first and second fixed fingers 134 and 136 of first and second drive units 120 and 122 are displaced away from centerline 124 toward an outer perimeter 152 of drive mass 114. However, in alternative embodiments, different locations for the movable fingers and the drive units may be selected while maintaining the basic design configuration of first and second drive units 120 and 122 being located on both sides of centerline 124, with first drive units 120 and second drive units 122 being transversely arranged relative to one another.

With continued reference to FIGS. 5 and 6, in operation, drive system 118 is actuated to move drive masses 114 and 116 of drive mass system 112 in an oscillatory linear motion within X-Y plane 24 along the drive axis, i.e. Y-axis 54, in antiphase. In accordance with a particular embodiment, second drive units 122 are driven in 180° phase opposition to first drive units 120. That is, first drive signal 74, DAU+, is applied to first fixed fingers 134 of first drive units 120 and second drive signal 76, DAU−, is applied second fixed fingers 136 of second drive units 122.

In the illustrated embodiment, drive masses 114 and 116 may be linearly oscillated in opposite directions substantially parallel to Y-axis 54 (i.e., up and down in FIG. 5). Once drive masses 114 and 116 are put into oscillatory motion along Y-axis 54, the system of masses 32, 114, and 116 is capable of detecting angular rate, i.e., angular velocity, induced by angular rate sensor 110 being rotated about X-axis 22. In particular, as a result of a Coriolis acceleration component, torsion springs 58 enable sense mass 32 to oscillate (i.e., rock) out of X-Y plane 24 as a function of angular rate, i.e., the angular velocity, of angular rate sensor 110 about X-axis of rotation 22. This movement has an amplitude that is proportional to the angular rotation rate of angular rate sensor 20 about the input axis, i.e., X-axis 22, and is sensed at electrodes 64 and 66.

Figure 7:
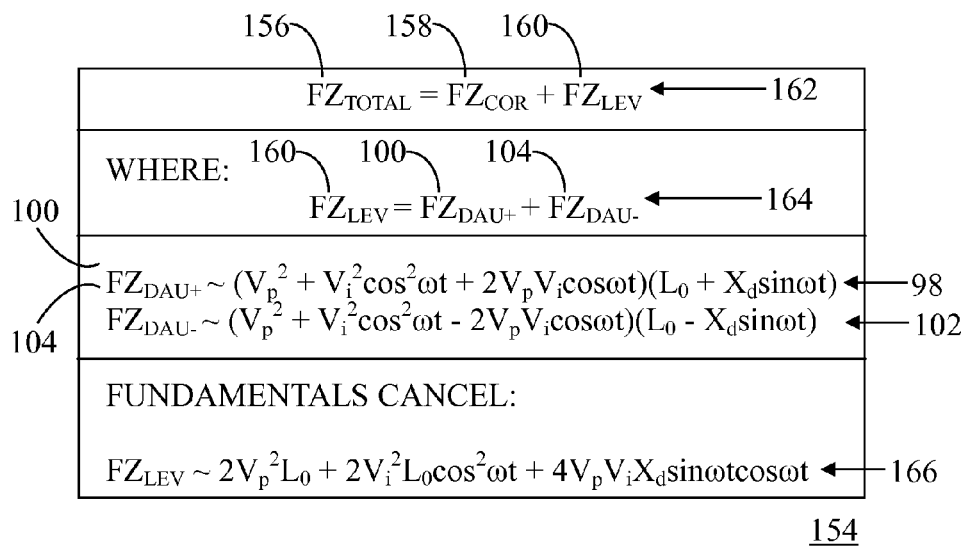
FIG. 7 shows a diagram of equations exemplifying compensation for the levitation effect in the inertial sensor of FIG. 5.

Referring to FIG. 7 in connection with FIGS. 5 and 6, FIG. 7 shows a diagram 154 of equations exemplifying compensation for the levitation effect in angular rate sensor 110. A total force 156, $FZ_{TOTAL}$, detectable along Z-axis 26 at electrodes 64 and 66 (FIG. 5), may be represented by the sum of a Coriolis acceleration component 158, $FZ_{COR}$, and a levitation force 160, $FZ_{LEV}$, as symbolized by an equation 162. However, levitation force 160, $FZ_{LEV}$, may be represented by the sum of a first levitation error component, i.e., levitation force 100, $FZ_{DAU+}$, resulting from first drive signal 74 and a second levitation error component, i.e., levitation force 104, $FZ_{DAU-}$, resulting from second drive signal 76, as symbolized by an equation 164.

Diagram 154 further includes formula 98 derived for levitation force 100 that is proportional to the applied first drive signal 74, DAU+, and second equation 102 derived for levitation force 102 that is proportional to the applied second drive signal 76, DAU−. Due to the arrangement of first and second drive units 120 and 122 at opposing sides of centerline 124, as discussed above, at least a portion of levitation force 100 cancels at least a portion of levitation force 104. In particular, the first harmonic frequencies, i.e., fundamentals 106 and 108 (FIG. 4), cancel so that only second and greater harmonics of the drive frequency may remain, as symbolized by an equation 166. Since fundamentals 106 and 108 cancel, the erroneous output typically produced by levitation effect 78 (FIG. 3) can be compensated for by suppressing or otherwise cancelling fundamentals 106 and 108 of levitation force 160, $FZ_{LEV}$.

Accordingly, methodology for operating inertial sensor 110 in order to compensate for levitation effect 78 (FIG. 4) in inertial sensor 110 entails actuating drive system 118 to move drive masses 114 and 116 in an oscillatory motion (antiphase) along drive axis 54 within a plane substantially parallel to surface 50 of substrate 28 (e.g., X-Y plane 24). In particular, first drive units 120 and second drive units 122 are actuated such that second drive units 122 are driven in phase opposition to first drive units 120. Once drive masses 114 and 116 are put into oscillatory motion along drive axis 54, sense mass 32 rocks in response to angular velocity about input axis 22. First drive units 120 produce first levitation error component 100 detectable along sense axis 26 and second drive units 122 produce second levitation error component 104 detectable along sense axis 26. However, since second drive units 122 are driven in phase opposition to first drive units 120, i.e., 180 degrees out-of-phase with first drive units 120, at least a first portion, e.g., fundamentals 106 and 108 (FIG. 4), of first levitation error component 100 substantially cancels at least a second portion, e.g., fundamentals 106 and 108, of second levitation error component 104.

The example provided above shows an organization of interleaved first and second drive units 120 and 122 as DAU+, DAU−, DAU+ at first side 126 and DAU−, DAU+, DAU− at second side 128. In alternative embodiments, the quantity and organization of interleaved drive units 120 and 122 may result in a differing number of groups of drive units, for example, DAU+, DAU−, DAU+, DAU−, DAU+, at first side 126 and DAU−, DAU+, DAU−, DAU+, DAU− at second side 128. In addition, the provided example shows structure pertaining to an anchor region of first and second drive units 120 and 122 coupling the drive units to the underlying substrate 28 as not being in mirror symmetry at opposing first and second sides 126. In alternative embodiments, these anchor regions may be oriented differently, as long as design principles are adhered to in accordance with the above embodiment of both of first and second drive units 120 and 122 being located at both of first and second sides 126 and 128, and being in an alternating arrangement relative to one another.

The example provided above represents a single-axis sensing angular rate sensor for detecting angular velocity about an X-axis that is parallel to the plane of the substrate. Those skilled in the art will readily appreciate that in alternative embodiments, a single axis angular rate sensor configuration may be provided that does not include a sense mass but instead excites a secondary oscillation in the drive mass due to the Coriolis acceleration component. Still other angular rate sensor configurations may not include two drive masses driven in antiphase as shown in the provided example. Alternatively, various single and dual axis inertial sensor designs may be envisioned with a different arrangement and location of fixed and movable fingers. Each of these various embodiments can still achieve the benefit associated with compensating for a levitation effect by the effective placement of the first and second drive units and application of drive signals in phase opposition.

In summary, embodiments of the invention entail microelectromechanical systems (MEMS) inertial sensor devices in the form of an angular rate sensor having drive units suitably arranged and where drive signals are applied to the drive units in phase opposition. These features can largely suppress or compensate for an erroneous output along the sense axis due to levitation of the drive mass. Consequently, greater accuracy of the signal output can be achieved.

Although the preferred embodiments of the invention have been illustrated and described in detail, it will be readily apparent to those skilled in the art that various modifications may be made therein without departing from the spirit of the invention or from the scope of the appended claims. That is, it should be appreciated that the exemplary embodiments are only examples, and are not intended to limit the scope, applicability, or configuration of the invention.

What is claimed is:

1. An inertial sensor comprising:
   a substrate;
   a drive mass flexibly coupled to said substrate, said drive mass including first movable fingers and second movable fingers, said drive mass having first and second opposing sides delineated by a centerline of said drive mass; and
   a drive system configured to oscillate said drive mass within a plane substantially parallel to a surface of said substrate, said drive system comprising:

first drive units coupled to said substrate and having first fixed fingers interleaved with said first movable fingers, at least one of said first drive units being located at said first side and at least another one of said first drive units being located at said second side; and second drive units coupled to said substrate and having second fixed fingers interleaved with said second movable fingers, at least one of said second drive units being located at said first side and at least another one of said second drive units being located at said second side, and said second drive units being driven in phase opposition to said first drive units.

2. An inertial sensor as claimed in claim 1 wherein:

said inertial sensor is configured to detect angular velocity about an input axis that is substantially parallel to said surface of said substrate;

said drive system moves said drive mass in an oscillatory motion along a drive axis that is substantially parallel to said surface of said substrate and substantially perpendicular to said input axis;

said first drive units produce a first error component detectable along a sense axis that is substantially perpendicular to said surface of said substrate; and said second drive units produce a second error component detectable along said sense axis, and at least a first portion of said first error component substantially cancels at least a second portion of said second error component.

3. An inertial sensor as claimed in claim 2 wherein said centerline of said drive mass is substantially parallel to said input axis.

4. An inertial sensor as claimed in claim 2 wherein said drive mass undergoes said oscillatory motion at a drive frequency, and said at least a first portion of said first error component and said at least a second portion of said second error component include a first harmonic frequency of said drive frequency.

5. An inertial sensor as claimed in claim 1 further comprising:

a sense mass; and flexible support elements connecting said sense mass to said drive mass, said flexible support elements enabling said sense mass to oscillate relative to said sense axis in response to said angular velocity.

6. An inertial sensor as claimed in claim 1 wherein:

said at least one of said first drive units located at said first side of said drive mass is aligned transverse to said centerline with said at least another one of said second drive units located at said second side; and said at least one of said second drive units located at said first side is aligned transverse to said centerline with said at least another one of said first drive units located at said second side of said drive mass.

7. An inertial sensor as claimed in claim 1 wherein:

said at least one of said second drive units located at said first side is adjacent to said at least one of said first drive units located at said first side; and said at least another one of said second drive units located at said second side is adjacent to said at least another one of said first drive units located at said second side.

8. An inertial sensor as claimed in claim 1 wherein:

each of said first drive units includes a first overlap region in which said first movable fingers and said first fixed fingers are immediately adjacent to one another; and each of said second drive units includes a second overlap region in which said second movable fingers and said second fixed fingers are immediately adjacent to one another, and said first and second overlap regions exhibit an overlap length that is substantially equivalent for said each of said first and second drive units.

9. An inertial sensor as claimed in claim 8 wherein said first and second overlap regions are displaced away from said centerline an equivalent distance.

10. An inertial sensor as claimed in claim 1 wherein said first and second drive units are displaced away from said centerline toward an outer perimeter of said drive mass.

11. An inertial sensor as claimed in claim 1 wherein said drive mass is a first drive mass, and:

said inertial sensor further comprises a second drive mass flexibly coupled to said substrate, said second drive mass including third movable fingers and fourth movable fingers, said second drive mass having third and fourth opposing sides delineated by a second centerline of said second drive mass; and said drive system is configured to oscillate said second drive mass within said plane in antiphase to said first drive mass, said drive system further including:

third drive units coupled to said substrate and having third fixed fingers interleaved with said third movable fingers, at least one of said third drive units being located at said third side and at least another one of said third drive units being located at said fourth side; and fourth drive units coupled to said substrate and having fourth fixed fingers interleaved with said fourth movable fingers, at least one of said fourth drive units being located at said third side and at least another one of said fourth drive units being located at said fourth side, said third drive units being driven in phase opposition to said fourth drive units.

* * * * *